(12) United States Patent
Yoshida

(10) Patent No.: US 6,453,025 B1
(45) Date of Patent: Sep. 17, 2002

(54) DATA COMMUNICATION APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/433,563

(22) Filed: Nov. 4, 1999

(30) Foreign Application Priority Data

Nov. 6, 1998 (JP) .......................................... 10-315663

(51) Int. Cl.[7] .......................... H04M 11/00; H04N 7/12
(52) U.S. Cl. ................... 379/100.01; 358/402; 358/403
(58) Field of Search .......... 379/100.01, 100.05–100.12, 379/100.14–100.17; 358/402, 403, 405, 434–436, 438, 439

(56) References Cited

U.S. PATENT DOCUMENTS 5,671,270 A 9/1997 Yoshida 6,137,597 A * 10/2000 Atsushi ...................... 358/402

* cited by examiner

*Primary Examiner*—Wing F. Chan
(74) *Attorney, Agent, or Firm*—Fitzpatrick, Cella, Harper & Scinto

(57) ABSTRACT

A data communication apparatus capable of selecting either a method corresponding to a memory box or a method in accordance with ITU-T.33. The communication controls for a received sub-address signal include a usage method corresponding to a memory box and a usage method in accordance with ITU-T.33. The communication control for the received sub-address signal is selected by a selection button. In a case when a user selects the method of registering the sub-address signal and a communication type in association with a corresponding memory box and # is not registered as the sub-address signal, # is received as the information of the sub-address signal from a partner apparatus, a message of confirming the method of using the sub-address signal or changing the method to another method is displayed.

15 Claims, 5 Drawing Sheets

DATA COMMUNICATION APPARATUS

BACKGROUND OF THE INVENTION

1. Field of the Invention

The present invention relates to a data communication apparatus such as a facsimile apparatus capable of receiving a sub-address signal.

2. Related Background Art

In a conventional facsimile apparatus capable of receiving a sub-address signal, sub-address signals and communication types are registered in correspondence with memory boxes, and when a sub-address signal is received, the communication type (or specified communication) of the memory box corresponding to the received sub-address signal is executed. The communication type includes a confidential reception, a relay broadcast (or multi-access) transmission, transfer transmission or the like.

A conventional apparatus is, however, associated with a problem that a calling side cannot directly designate a destination of the relay broadcast transmission.

In order to solve this problem, ITU-T.33 Recommendation proposes routing by using a sub-address signal.

However, this method has a critical problem that a method of using a sub-address signal in association with a memory box cannot perform routing.

SUMMARY OF THE INVENTION

It is an object of the present invention to provide a data communication apparatus capable of selectively using a method of using a sub-address signal in association with a memory box and a method of using a sub-address signal for routing in conformity with ITU-T.33 Recommendation.

According to one aspect of the invention, a data communication apparatus capable of receiving a sub-address signal in conformity with ITU-T Recommendations, is provided with comprises: means for registering one of a plurality of data communication controls when the sub-address signal is received; and communication control means for selectively executing a plurality of data processing corresponding to the received sub-address signal in accordance with the communication control registered in the registering means.

DETAILED DESCRIPTION OF THE PREFERRED EMBODIMENTS

Figure 1:
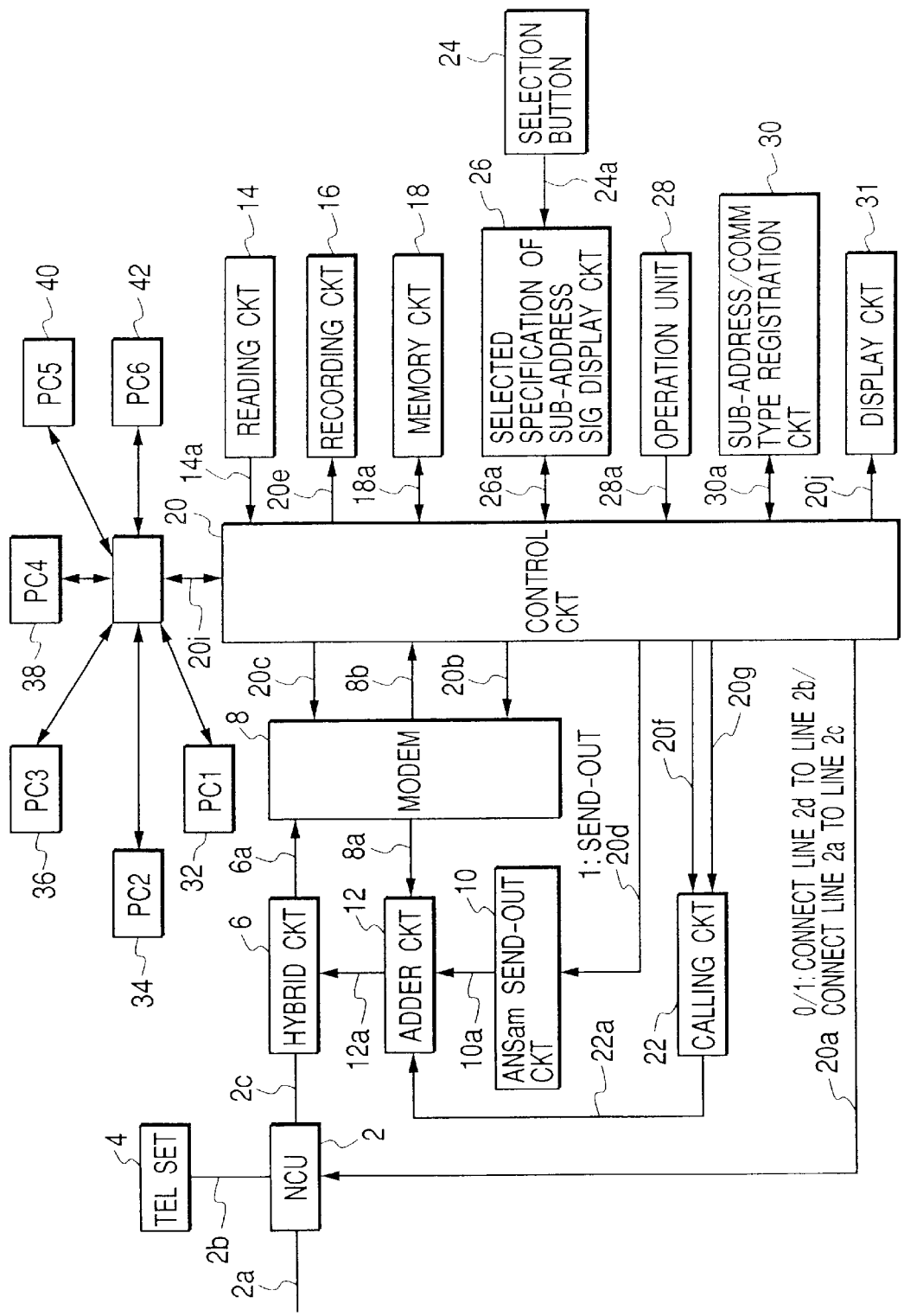
FIG. 1 is a block diagram showing a facsimile apparatus according to an embodiment of the invention.

FIG. 1 is a block diagram showing a facsimile apparatus according to an embodiment of the invention.

An NCU (network control unit) 2 is connected to a terminal of a telephone network and controls to connect to a switched telephone network, to switch a telephone line to a data communication line, and to hold a loop, in order to use the telephone network for data communications or the like.

NCU 2 connects a telephone line 2a to a telephone set 4 if the level of a signal (signal line 20a) from a control circuit 20 is "0", and connects the telephone line 2a to a facsimile apparatus if the signal level is "1". In an normal state, the telephone line 2a is connected to the telephone set 4.

A hybrid circuit 6 separates a transmission signal and a reception signal, sends out the transmission signal from an adder circuit 12 to the telephone line 2a via NCU 2, and receives a partner signal from NCU 2 to send it via a signal line 6a to a modem 8.

The modem 8 performs modulation/demodulation in accordance with ITU-T Recommendations V.8, V.21, V.27ter, V.29, V.17 or V.34, each transmission mode being designated by a signal supplied from a signal line 20c. The modem 8 receives a signal from a signal line 20b, outputs modulated data to a signal line 8a, or receives a signal from the signal line 6a and outputs demodulated data to a signal line 8b.

An ANSam send-out circuit 10 sends out an ANSam signal. When a signal having the level "1" is output to a signal line 20d, the ANSam send-out circuit 10 sends out the ANSam signal to a signal line 10a, whereas when a signal having the level "0" is output to the signal line 20d, it sends out no signal to the signal line 10a.

The adder 12 receives signals from the signal lines 8a, 10a and 22a, and outputs the addition signal to a signal line 12a. A reading circuit 14 reads an original image and outputs the read image data to a signal line 14a. A recording circuit 16 sequentially records signals from a signal line 20e one line after another.

A memory circuit 18 stores raw read data, encoded data, received data, or decoded data.

A calling circuit 22 receives telephone number data on a signal line 20f when a calling instruction pulse is output to a signal line 20f, and outputs a DTMF (dual-tone multi-frequency signal) selection signal to the signal lines 22a.

A selection button 24 is used for selecting a specification (how to use) of a sub-address signal upon reception thereof by depressing the button. When this button 24 is depressed, a depression pulse is output to a signal line 24a.

A display circuit 26 is a circuit which is used for displaying the specification of the sub-address signal upon reception thereof. When a clear pulse is output to the signal line 26a, the display circuit 26 displays "sub-address signal is used for designating memory box". Thereafter, each time the depression pulse is output to the signal line 24a, the display circuit 26 displays in succession "sub-address signal is used for routing", "sub-address signal is used for designating memory box", "sub-address signal is used for routing", and so on. While "sub-address signal is used for designating memory box" is displayed, a signal having the level "0" is output to the signal line 26a, whereas while "sub-address signal is used for routing" is displayed, a signal having the level "1" is output to the signal line 26a.

An operation unit 28 has a one-touch dial, an abbreviated dial, numerical keys, a * key, a # key, a start key, a set key, a registration key to the circuit 30, a sub-address signal input key, and other function keys. Information on a depressed key is output to a signal line 28a.

A registration circuit 30 is a circuit for registering sub-address signals and communication types associated with respective memory boxes. The communication types to be registered from a signal line 30a include confidential reception, relay broadcast transmission, transfer transmission and the like.

A display circuit 31 receives data from a signal line 20j and displays it.

PC's 32, 34, 36, 38, 40 and 42 represent first to sixth personal computers which are LAN-connected via a signal line 20i.

In this embodiment, a control circuit 20 controls the whole of the facsimile apparatus capable of receiving a sub-address signal according to the ITU-T Recommendation. In this embodiment, the control circuit 20 has a function of controlling to selectively executing a plurality of communication controls corresponding to a received sub-address signal. When the sub-address signal is received, the communication control is selected by the selection button 24 and executed.

More specifically, the communication controls corresponding to a received sub-address signal include a usage method of registering a sub-address signal and a communication type in association with a corresponding memory box and a method of using a sub-address signal in accordance with T.33. Either of the methods can be is executed upon selection by a user.

In a case when the user selects the usage method of registering a sub-address signal and a communication type in association with a corresponding memory box and # is not registered as the sub-address signal, # is received as the information of the sub-address signal from a partner apparatus, a message of confirming the method of using the sub-address signal is displayed. If a percentage of receiving # as the information of the sub-address signal from a partner apparatus exceeds a predetermined value, a message of changing the method to the method of using the sub-address signal in accordance with T.33 is displayed.

FIGS. 2 to 5 are flow charts illustrating the operation of the control circuit 20 of this embodiment.

Figure 2:
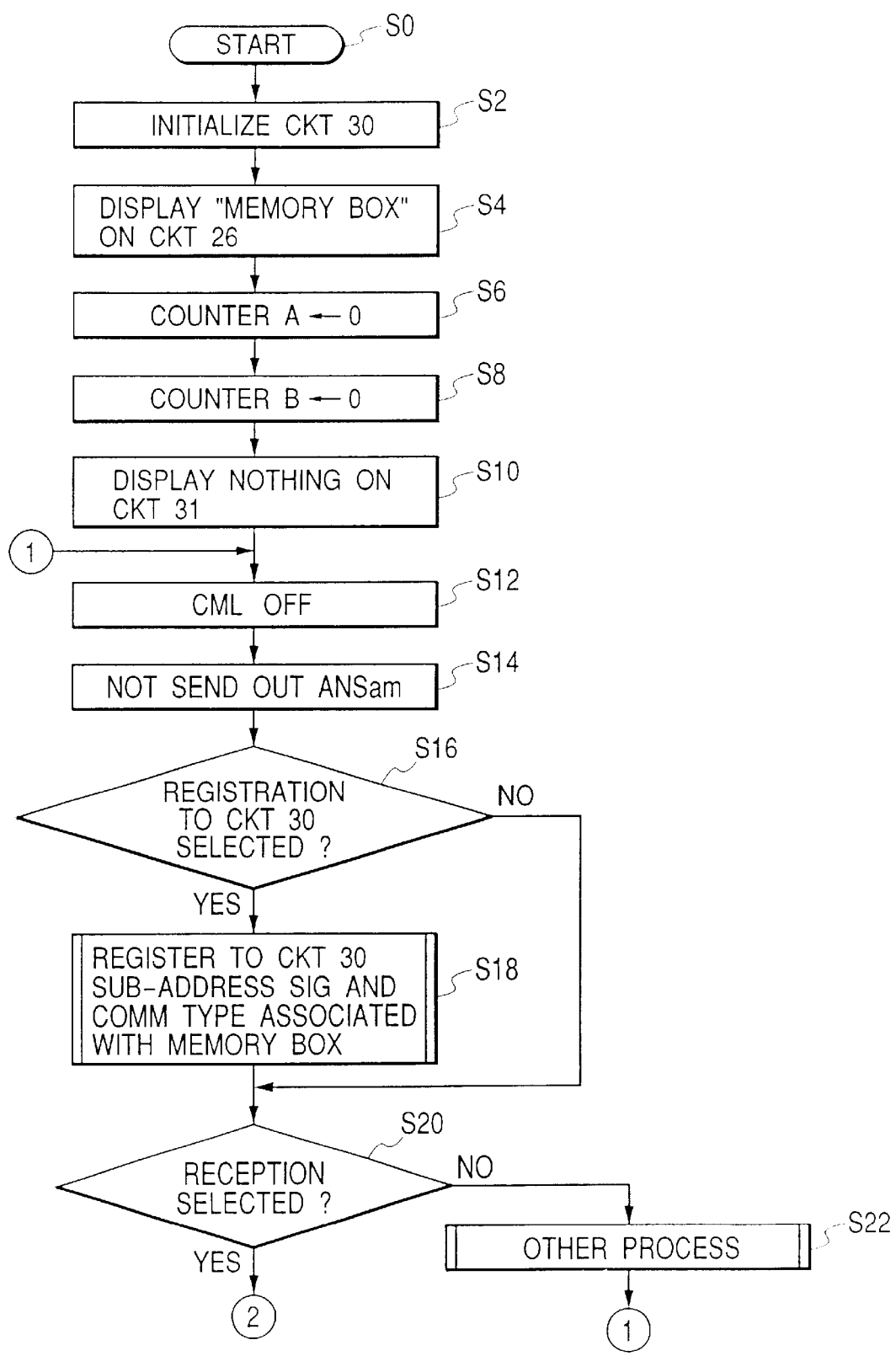
FIG. 2 is a flow chart illustrating the operation of the apparatus of the embodiment.
Figure 3:
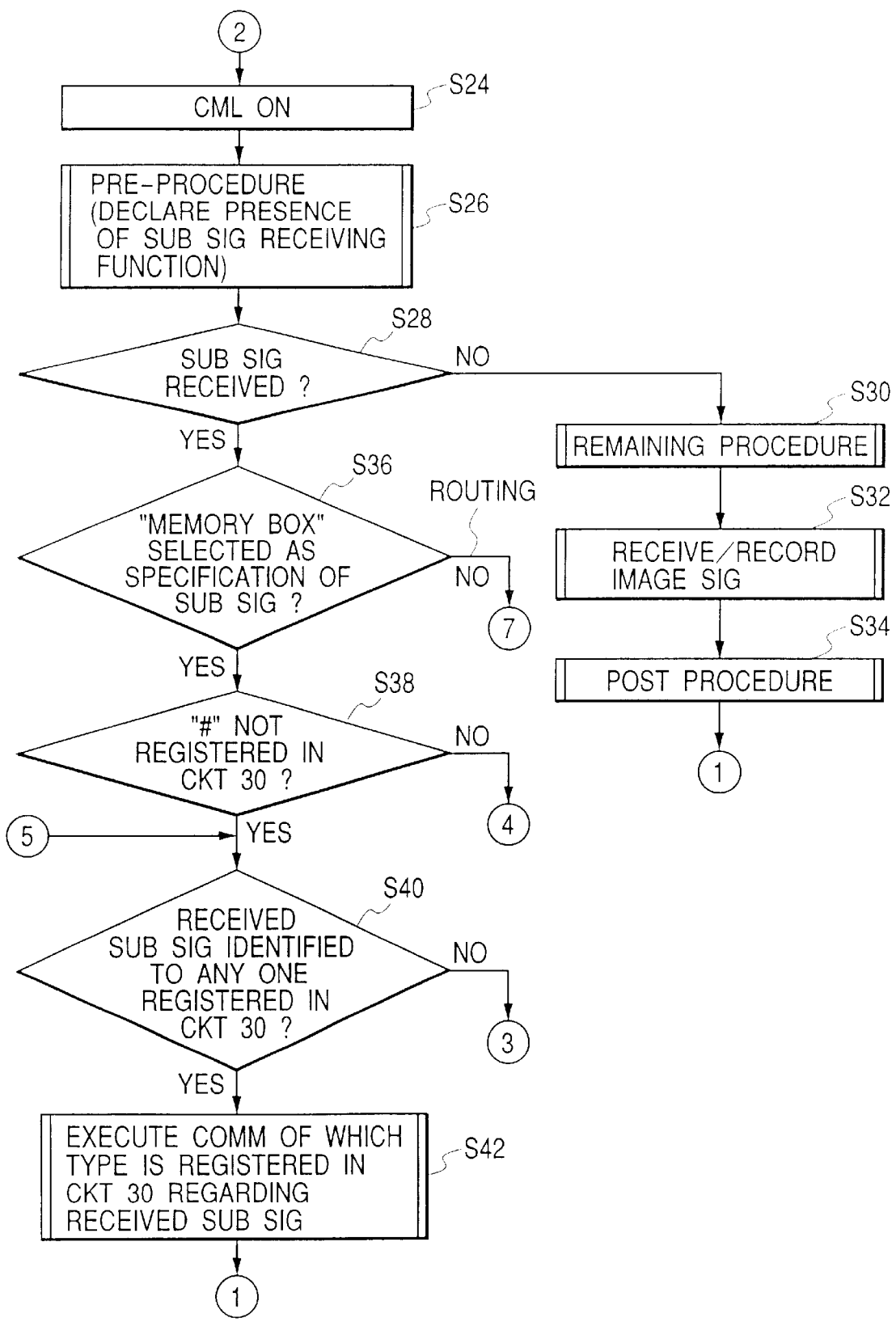
FIG. 3 is a flow chart illustrating the operation of the apparatus of the embodiment.
Figure 4:
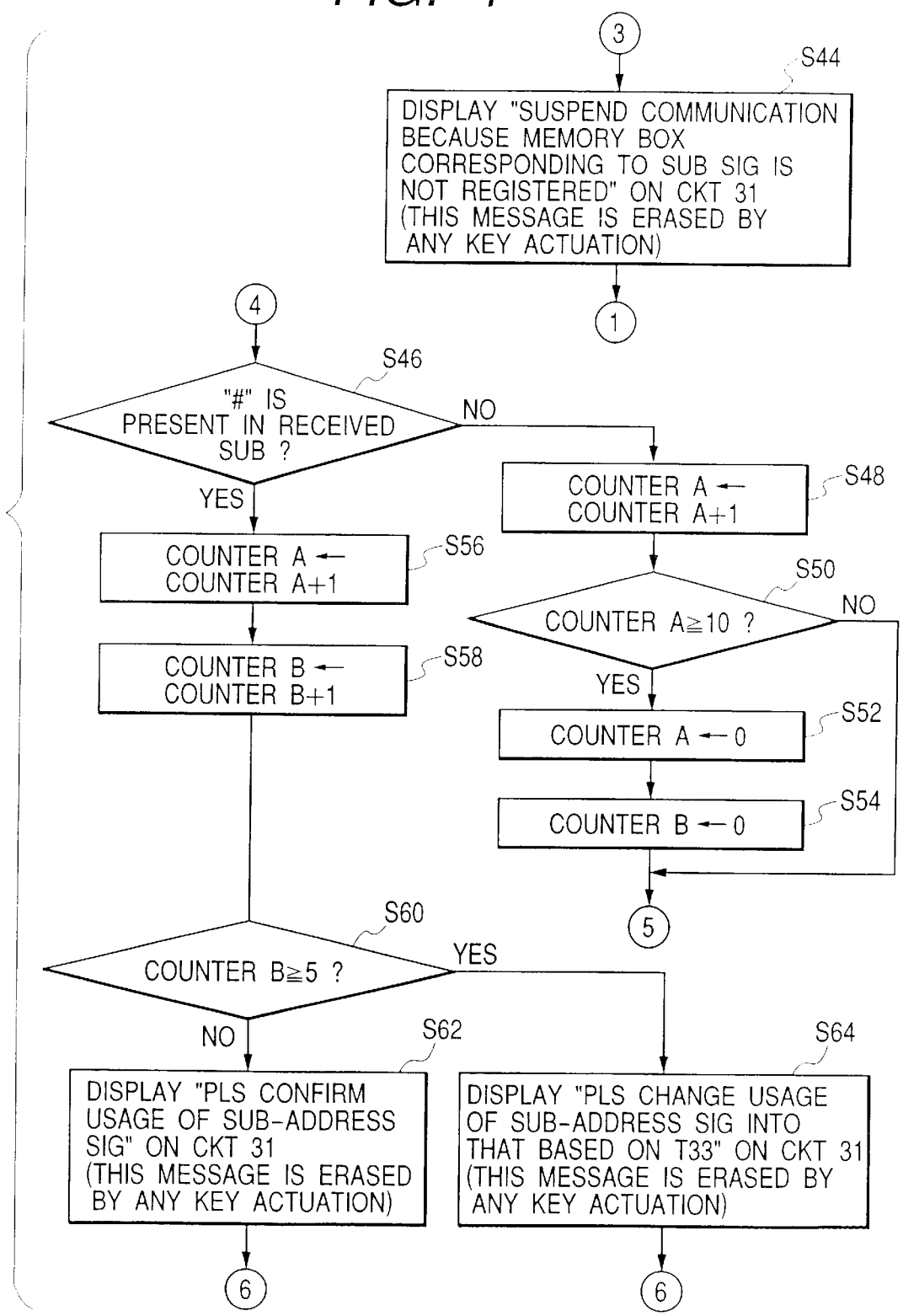
FIG. 4 is a flow chart illustrating the operation of the apparatus of the embodiment.
Figure 5:
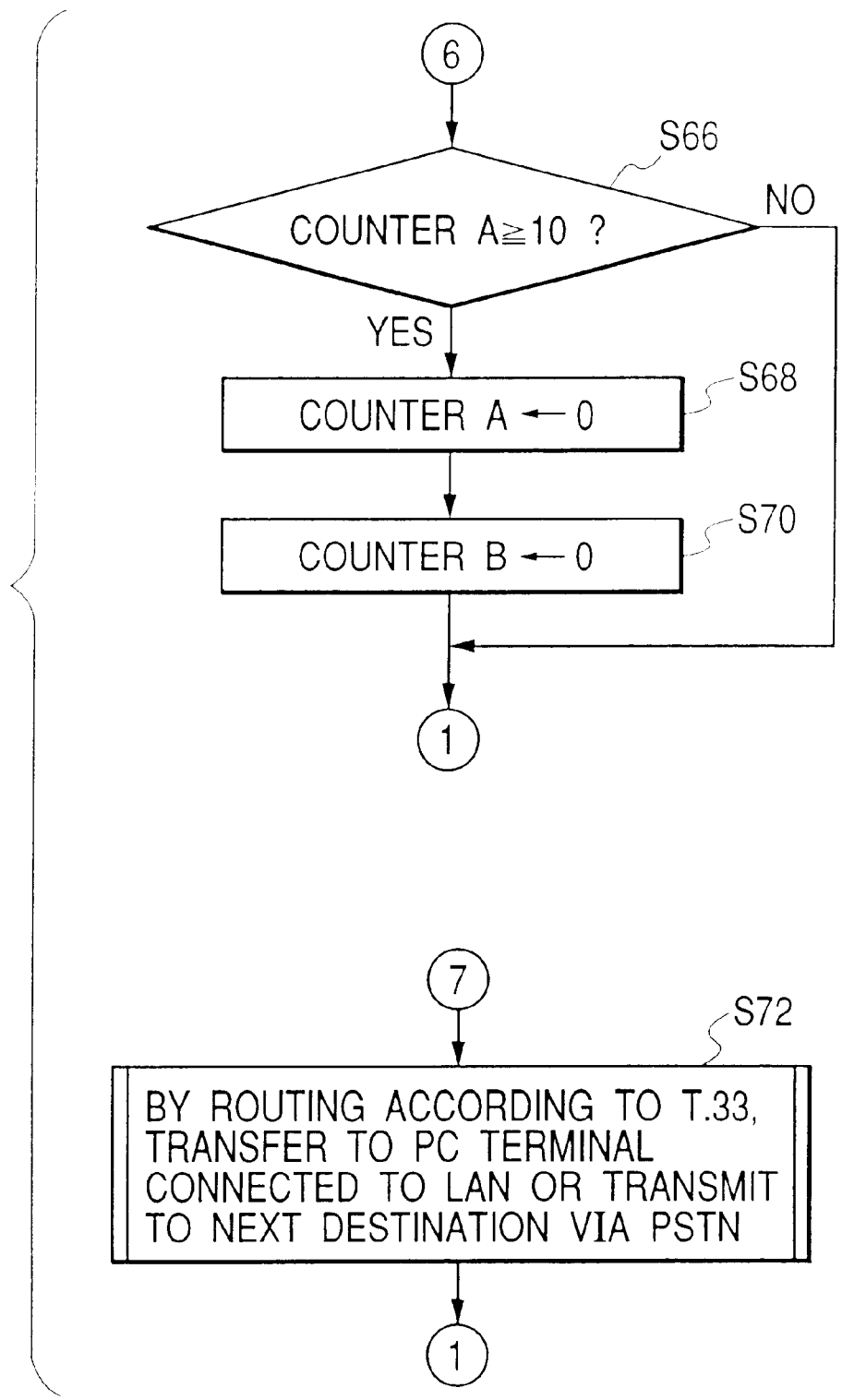
FIG. 5 is a flow chart illustrating the operation of the apparatus of the embodiment.

Referring to FIG. 2, the operation starts at S0. At S2 the data in the circuit 30 is initialized via the signal line 30a. At S4 a clear pulse is output to the signal line 26a to display "memory box" on the display circuit 26 as the specification (how to use) of the sub-address signal.

At S6 a counter A (not shown) is cleared and at S8 a counter B (not shown) is cleared. These counters A and B are used for the control which is executed in a case when the specification is directed to a memory box and # is not registered in the circuit 30, a sub-address signal with # is received.

At S10 no data is displayed on the display circuit 31 via the signal lines 20j. At S12 a signal having the signal level "0" is output to the signal line 20a to turn off a CML. At S14 a signal having the level "0" is output to the signal line 20d so as not to transmit an ANSam signal.

At S16 it is checked from data on the signal line 28a whether registration to the circuit 30 has been selected. If selected, the flow advances to S18 whereat a sub-address signal and a communication type corresponding to a memory box are registered in the circuit 30 via the signal line 30a, and then advances to S20. If not selected at S16, the flow skips to S20.

At S20 it is checked whether a reception has been selected. If selected, the flow advances to S24, whereas if not, the flow advances to S22 whereat other processing is performed.

At S24 a signal having the signal level "1" is output to the signal line 20a to turn on CML. S26 is a pre-procedure of notifying a presence of the function of receiving the sub-address signal to the partner apparatus.

At S28 it is checked whether the sub-address signal is received from the partner apparatus. If received, the flow advances to S36, whereas if not, the flow advances to S30.

At S30 the remaining pre-procedure is executed, at S32 an image signal is received/recorded, and at S34 a post-procedure is executed to thereafter return to S12.

At S36 data on the signal line 26a is acquired to check the specification upon reception of the sub-address signal and if "memory box" is selected, the flow advances to S38, whereas if "routing" in accordance with T.33 is selected, the flow advances to S72.

At S38 it is checked whether in the addition that the sub-address signal and communication type corresponding to the memory box are registered in the circuit 30, # is registered as the sub-address signal in the circuit 30. If not registered, the flow advances to S36, whereas if registered, the flow advances to S40.

At S40 it is checked whether the received sub-address signal is coincide with the sub-address signal registered in the circuit 30. If coincident, the flow advance to S42, whereas if not, the flow advances to S44.

At S42 the communication type (specified communication) of the memory box registered in the circuit 30 and corresponding to the received sub-address signal is executed to thereafter return to S12.

At S44 a message of a communication disconnection because the memory box corresponding to the received sub-address signal is not registered, is displayed on the display circuit 31 via the signal line 20j. This message can be erased upon actuation of a predetermined key. Thereafter, the flow returns to S12.

At S46 it is checked if the received sub-address signal contains #. If contains, the flow advances to S56, whereas if not, the flow advances to S48.

At S48 the counter A is incremented by "1". At S50 it is checked whether the count of the counter A is 10 or greater. If 10 or greater, the flow advances to S52 whereat the counter A is set to "0" and at S54 the counter B is set to "0" to thereafter follow S40. If the count of the counter A is smaller than 10, the flow returns to S40.

At S56 the counter A is incremented by "1", and at S58 the counter B is incremented by "1". At S60 it is checked whether the count of the counter B is 5 or greater. If 5 or greater, the flow advances to S64, whereas if smaller than 5, the flow advances to S62.

At S62 a message "please confirm the method of using the sub-address signal" is displayed on the display circuit 31 via the signal line 20j. This message can be erased upon actuation of a predetermined key. Thereafter the flow advances to S66.

At S64 a message "please change to the method of using the sub-address signal to that of using the sub-address signal for routing in accordance with T.33" is displayed on the display circuit 31 via the signal line 20j. This message can be erased upon actuation of a predetermined key. Thereafter the flow advances to S66.

At S66 it is checked whether the count of the counter A is 10 or greater. If 10 or greater, the flow advances to S68 whereat the counter A is set to "0" and at S70 the counter B is set to "0" to thereafter return to S12. If the count of the counter A is smaller than 10, the flow returns to S12.

At S72 data is supplied to a LAN-connected personal computer or transmitted to the next destination via a PSTN (public switched telephone network, not shown), respectively through routing in conformity with T.33. Thereafter the flow returns to S12.

The operation of the control circuit described above can be executed by a CPU of the control circuit which runs a program stored in a ROM, a RAM or the like. The invention is also applicable to the case wherein such a program is stored in a floppy disk, a hard disk, an optical disk, a CD-ROM, or an external storage unit such as a memory card, the stored program is read by a dedicated reader to be supplied to the control circuit, and CPU of the control circuit executes this program.

In the above embodiment, a stand-alone type facsimile apparatus is used by way of example. The invention is not limited only thereto, but is applicable to data communication control of a versatile data processing system having a copy function, an electronic file function, a data processing function and a communication function. The invention is also applicable to a communication apparatus having discrete reading and recording circuits.

As described so far, according to the invention, if a user system adopts the method of using the sub-address signal in association with a memory box, this method is selected, whereas if the user system adopts the method of using the sub-address signal for routing in accordance with ITU-T.33 Recommendations, this method is selected. A system very easy to use can therefore be provided.

According to the invention, if a user selects the method of using the sub-address signal in association with the memory box, if # is not registered in the memory box as the sub-address signal, and when # is received as the information of the sub-address signal in accordance with T.33, a message of confirming the method of using the sub-address signal is displayed. If a percentage of receiving # as the information of the sub-address signal exceeds a predetermined value, a message of changing the method to the method of using the sub-address signal in accordance with T.33 is displayed. A user can perform a proper operation in accordance with these messages.

What is claimed is:

1. A data communication apparatus that functions to receive a sub-address address signal in accordance with an ITU-T recommendation, said apparatus comprising:
   registration means for registering a data communication control upon reception of a sub-address signal from a plurality of communication controls; and
   communication control means for selectively executing a plurality of data processing operations corresponding to the received sub-address signal, in accordance with the communication control registered by said registration means,
   wherein the plurality of communication controls includes a usage method of registering a sub-address and a communication type, in association with a corresponding memory box, and a usage method in accordance with a T.33 protocol.

2. A data communication apparatus according to claim 1, further comprising notifying means for issuing a notice to urge a user, in a case when the user selects a method of using the sub-address signal and a communication type in association with a corresponding memory box and # is not registered as the sub-address signal, a sub-address signal with # is received from a partner apparatus, to confirm the method of using the sub-address signal.

3. A data communication apparatus according to claim 2, wherein said notifying means displays a message on a display unit.

4. A data communication apparatus according to claim 2, wherein said notifying means issues a notice to urge the user to change to a method of using the sub-address signal in accordance with the T.33 protocol, if a percentage of receiving the sub-address signal with # from the partner apparatus takes a value larger than a predetermined value.

5. A data communication apparatus according to claim 4, wherein said notifying means displays a message on a display unit.

6. A data communication method comprising the steps of:
   preparing a data communication apparatus that functions to receive a sub-address signal in accordance with an ITU-T recommendation;
   registering a data communication control upon reception of the sub-address signal, from a plurality of communication controls; and
   selectively executing a plurality of data processing operations corresponding to the received sub-address signal, in accordance with the communication control registered in said registering step,
   wherein the plurality of communication controls includes a method of registering a sub-address signal and a communication type, in association with a corresponding memory box, and a method in accordance with a T.33 protocol.

7. A data communication method according to claim 6, further comprising the step of notifying a user, in a case when the user selects a method of using the sub-address signal and a communication type in association with a corresponding memory box and # is not registered as the sub-address signal, a sub-address signal with # is received from a partner apparatus, to confirm the method of using the sub-address signal.

8. A data communication method according to claim 7, wherein said notifying step displays a message on a display unit.

9. A data communication method according to claim 7, wherein said notifying step includes notifying the user to change to a method of using the sub-address signal in accordance with the T.33 protocol, if a percentage of receiving the sub-address signal with # from the partner apparatus takes a value larger than a predetermined value.

10. A data communication method according to claim 9, wherein said notifying step displays a message on a display unit.

11. A data communication apparatus that functions to receive a sub-address signal in accordance with an ITU-T recommendation, said apparatus comprising:
    a registration unit adapted to register a data communication control upon reception of a sub-address signal from a plurality of communication controls; and
    a communication control unit adapted to selectively execute a plurality of data processing operations corresponding to the received sub-address signal, in accordance with the communication control registered by said registration unit,
    wherein the plurality of communication controls includes a usage method of registering a sub-address and a communication type, in association with a corresponding memory box, and a usage method in accordance with a T.33 protocol.

12. A data communication apparatus according to claim 11, further comprising a notification unit adapted to issue a notice to urge a user, in a case when the user selects a method of using the sub-address signal and a communication type in association with a corresponding memory box and # is not registered as the sub-address signal, a sub-address signal with # is received from a partner apparatus, to confirm the method of using the sub-address signal.

13. A data communication apparatus according to claim 12, wherein said notification unit displays a message on a display unit.

14. A data communication apparatus according to claim 12, wherein said notification unit issues a notice to urge the user to change to a method of using the sub-address signal in accordance with the T.33 protocol, if a percentage of receiving the sub-address signal with # from the partner apparatus takes a value larger than a predetermined value.

15. A data communication apparatus according to claim 14, wherein said notification unit displays a message on a display unit.

* * * * *